United States Patent
Liu et al.

(10) Patent No.: US 10,883,826 B2
(45) Date of Patent: Jan. 5, 2021

(54) THREE-DIMENSIONAL TOPOGRAPHIC MAPPING SYSTEM AND MAPPING METHOD

(71) Applicants: Dongguan Frontier Technology Institute, Dongguan (CN); SHENZHEN KUANG-CHI SPACE TECH. CO. LTD., Shenzhen (CN)

(72) Inventors: Ruopeng Liu, Shenzhen (CN); Lin Luan, Shenzhen (CN); Wenlong Zhou, Shenzhen (CN); Jianghuang Lu, Shenzhen (CN); Xiaohui Yao, Shenzhen (CN); Weian Zhong, Shenzhen (CN)

(73) Assignees: Dongguan Frontier Technology Institute, Dongguan (CN); SHENZHEN KUANG-CHI SPACE TECH. CO. Ltd., Shenzhen (CN)

( * ) Notice: Subject to any disclaimer, the term of this patent is extended or adjusted under 35 U.S.C. 154(b) by 505 days.

(21) Appl. No.: 15/844,540

(22) Filed: Dec. 16, 2017

(65) Prior Publication Data

US 2018/0108175 A1   Apr. 19, 2018

Related U.S. Application Data

(63) Continuation of application No. PCT/CN2016/100304, filed on Sep. 27, 2016.

(30) Foreign Application Priority Data

Sep. 28, 2015 (CN) .......................... 2015 1 0642583

(51) Int. Cl.
*G01C 11/02* (2006.01)
*G01S 17/89* (2020.01)
(Continued)

(52) U.S. Cl.
CPC ............ *G01C 11/02* (2013.01); *G01C 15/002* (2013.01); *G01C 21/00* (2013.01); *G01S 7/003* (2013.01);
(Continued)

(58) Field of Classification Search
CPC ....... G01C 15/002; G01S 17/86; G01S 17/89; G01S 7/003
See application file for complete search history.

(56) References Cited

U.S. PATENT DOCUMENTS 5,724,125 A * 3/1998 Ames ........................ G01P 5/26
356/28.5
8,599,367 B2 * 12/2013 Canham ................... G01C 3/08
356/5.01
(Continued)

FOREIGN PATENT DOCUMENTS

CN       1184929 A       6/1998
CN     101241011 A       8/2008
(Continued)

OTHER PUBLICATIONS

Kerle, Real-time data collection and information generation using airborne sensors, Geospatial Information Technology for Emergency Response—Zlatanova & Li (Year: 2008).*
(Continued)

*Primary Examiner* — Michael J Dalbo
(74) *Attorney, Agent, or Firm* — Armstrong Teasdale LLP

(57) ABSTRACT

The present disclosure discloses a three-dimensional topographic mapping system and mapping method. The system includes: a floating platform, a detection apparatus, and a ground apparatus, where the floating platform is located in the stratosphere above a predetermined ground area that is to be mapped; the detection apparatus is arranged on the floating platform and configured to map the predetermined
(Continued)

ground area according to mapping instruction information transmitted by the ground apparatus, and return mapping data to the ground apparatus; and the ground apparatus processes the returned mapping data to obtain DEM data. In the three-dimensional topographic mapping system according to embodiments of the present disclosure, the detection apparatus is arranged on the floating platform to map the predetermined ground area and cooperate with the ground apparatus to calculate the mapping data.

11 Claims, 5 Drawing Sheets

(51) Int. Cl.
| | |
|---|---|
| G01C 15/00 | (2006.01) |
| G01S 7/481 | (2006.01) |
| G01S 17/42 | (2006.01) |
| G01S 7/00 | (2006.01) |
| G01C 21/00 | (2006.01) |
| G01S 17/86 | (2020.01) |
| G06T 17/05 | (2011.01) |

(52) U.S. Cl.
CPC .......... *G01S 7/4812* (2013.01); *G01S 7/4817* (2013.01); *G01S 17/42* (2013.01); *G01S 17/86* (2020.01); *G01S 17/89* (2013.01); *G06T 17/05* (2013.01); *G06T 2207/10032* (2013.01)

(56) References Cited

U.S. PATENT DOCUMENTS

| | | | | |
|---|---|---|---|---|
| 9,836,063 | B1* | 12/2017 | Bonawitz | ................... B64B 1/40 |
| 2004/0141170 | A1* | 7/2004 | Jamieson | ................ G01S 7/483 |
| | | | | 356/5.01 |
| 2009/0168045 | A1* | 7/2009 | Lin | ....................... G01S 7/4817 |
| | | | | 356/4.01 |
| 2009/0284258 | A1 | 11/2009 | Morrison et al. | |
| 2010/0189135 | A1* | 7/2010 | Garneau | ............... H04J 3/0661 |
| | | | | 370/498 |
| 2014/0172357 | A1 | 6/2014 | Heinonen | |
| 2014/0177928 | A1* | 6/2014 | Bangay | ................... G06T 7/521 |
| | | | | 382/113 |
| 2014/0297069 | A1* | 10/2014 | Landes | ................... E01B 35/00 |
| | | | | 701/19 |
| 2016/0084945 | A1* | 3/2016 | Rodrigo | ............... G01S 7/4917 |
| | | | | 356/5.01 |
| 2016/0093212 | A1* | 3/2016 | Barfield, Jr. | ......... G08G 1/0133 |
| | | | | 348/144 |

FOREIGN PATENT DOCUMENTS

| | | |
|---|---|---|
| CN | 203005740 U | 6/2013 |
| ES | 2366717 A1 | 10/2011 |

OTHER PUBLICATIONS

Huo, Wei et al., Journal of China Academy of Electronics and Information Technology, ping2liu2ceng2 ping2tai2 ren4wu4 xi4tong3 yuan2xing2 she4ji4 yu3 yan2jiu2, vol. 8, No. 3, Jun. 30, 2013 (Jun. 30, 2013) ISSN: 1673-5692, pp. 316-319.

Extended European Search Report for corresponding European App. No. 16850325.8, dated Jan. 22, 2019, 10 pages.

N Kerle, et al. "Real-time data collection and information generation using airborne sensors," Geospatial Information Technology for Emergency Response pp. 43-74, Oct. 30, 2007.

\* cited by examiner

THREE-DIMENSIONAL TOPOGRAPHIC MAPPING SYSTEM AND MAPPING METHOD

CROSS REFERENCE TO RELATED APPLICATIONS

This application is a continuation of PCT Application No. PCT/CN2016/100304 filed on 2016 Sep. 27, which claims priority to CN Patent Application No. 201510642583.2 filed 2015 Sep. 28, both of which are incorporated herein by reference.

TECHNICAL FIELD

The present disclosure relates to the field of mapping technologies, and specifically, to a three-dimensional topographic mapping system and mapping method.

BACKGROUND

With the rapid development of science and technology, human activities have an increasingly high requirement on accuracy and an update rate of a map, from travel in life and plant buildings to urban planning and military mapping, and acquisition of high-precision three-dimensional Digital Elevation Model (DEM for short) data becomes a focus in the mapping field. For work of acquiring three-dimensional DEM data, ground manual mapping is the most original and effective method, which can obtain highest-precision and highest-resolution mapping data. However, the ground manual mapping has such drawbacks as low efficiency, large manpower consumption, high time cost, and is not suitable for large-scale mapping. At present, aerial photogrammetry is a main way to quickly obtain high-resolution and high-precision DEM data. However, aerial mapping is affected by aviation control, and it is difficult to apply for mapping routes. Especially in a key urban area, the aerial mapping is even more restricted. As a result, the aerial mapping can hardly guarantee an update speed.

To avoid an impact of aviation control, the prior art uses a method of installing a laser mapping radar on a remote control aircraft to realize geodetic mapping. The method uses the remote control aircraft as a mapping carrier, so as to avoid the impact of aviation control on mapping work. However, the method also has some defects: (1) The remote control aircraft is poor in flight stability, so that it is difficult to guarantee mapping accuracy; and (2) the remote control aircraft flies low, a mapping footprint of the remote control aircraft is small although laser mapping has a high resolution at a single point, and it takes a very long time to realize wide-range mapping, resulting in relatively low mapping efficiency.

Currently, no effective solution is yet proposed to resolve a problem in the prior art that mapping accuracy and mapping efficiency are relatively low when a remote control aircraft is used for mapping of three-dimensional DEM data.

SUMMARY

A main purpose of the present disclosure is to provide a three-dimensional topographic mapping system and mapping method to resolve a problem in the prior art that mapping accuracy and mapping efficiency are relatively low when a remote control aircraft is used for mapping of three-dimensional DEM data.

To achieve the foregoing purpose, according to an aspect of an embodiment of the present disclosure, a three-dimensional topographic mapping system is provided. The three-dimensional topographic mapping system according to the present disclosure includes: a floating platform, where the floating platform is located in the stratosphere above a predetermined ground area that is to be mapped; a detection apparatus, arranged on the floating platform and configured to map the predetermined ground area according to mapping instruction information transmitted by a ground apparatus, and return mapping data to the ground apparatus; and the ground apparatus, configured to transmit the mapping instruction information to the detection apparatus according to a predetermined mapping task, and process the mapping data returned by the detection apparatus, to obtain three-dimensional digital elevation model DEM data of the predetermined ground area.

Optionally, the detection apparatus includes: a detection angle adjustment apparatus, connected to a lidar detector and configured to control, according to detection time information and detection angle information that are calculated by a controller, the lidar detector to point to a start detection point of the predetermined ground area, and point to all target detection points of the predetermined ground area according to a predetermined trajectory; the lidar detector, configured to transmit, according to the detection time information calculated by the controller, a first laser detection signal to all the target detection points of the predetermined ground area, and receive a second laser detection signal reflected by the target detection point; and the controller, connected to the detection angle adjustment apparatus and the lidar detector and configured to calculate the detection time information and the detection angle information according to the mapping instruction information, form the mapping data by using the first laser detection signal and the second laser detection signal, and return the mapping data to the ground apparatus.

Optionally, the lidar detector includes: a laser generation unit, configured to generate the first laser detection signal; a laser emitting head, connected to the laser generation unit and configured to transmit the first laser detection signal to the target detection point of the predetermined ground area; and a reflective telescope, configured to receive the second laser detection signal reflected by the target detection point of the predetermined ground area.

Optionally, the detection angle adjustment apparatus includes: a pitch angleadjustment unit, configured to adjust a pitch angle of the lidar detector; and a horizontal angle-adjustment unit, configured to adjust a horizontal angle of the lidar detector.

Optionally, the controller includes: a calculation unit, configured to calculate the detection time information and the detection angle information according to the mapping instruction information; an information adding unit, configured to add the detection time information, the detection angle information, and three-dimensional location coordinates of the lidar detector to the first laser detection signal and the second laser detection signal; and an encoding unit, configured to encode the first laser detection signal and the second laser detection signal to which the detection time information, the detection angle information, and the three-dimensional location coordinates of the lidar detector are added, to obtain the mapping data.

Optionally, the detection apparatus further includes: a global positioning system (GPS) device, connected to the controller and configured to collect the three-dimensional location coordinates of the lidar detector and update a reference time of the controller.

Optionally, the detection apparatus further includes: a wind speed measurement apparatus, connected to the controller and configured to collect wind speed information of a location at which the lidar detector is located, where the encoding unit is further configured to correct the three-dimensional location coordinates of the lidar detector according to the wind speed information.

Optionally, the detection apparatus further includes: a signal processor, connected to the lidar detector and configured to process the second laser detection signal reflected by the target detection point.

Optionally, the detection apparatus further includes: a communications antenna, connected to the controller, where the controller receives the mapping instruction information by using the communications antenna, and returns the mapping data to the ground apparatus by using the communications antenna.

To achieve the foregoing purpose, according to another aspect of an embodiment of the present disclosure, a three-dimensional topographic mapping method using the foregoing three-dimensional topographic mapping system is provided. The three-dimensional topographic mapping method according to the present disclosure includes: receiving mapping instruction information transmitted by a ground apparatus of the three-dimensional topographic mapping system according to a predetermined mapping task; and mapping a predetermined ground area according to the mapping instruction information, and returning mapping data to the ground apparatus for processing, to obtain three-dimensional DEM data of the predetermined ground area.

Optionally, the mapping a predetermined ground area according to the mapping instruction information includes: calculating detection time information and detection angle information according to the mapping instruction information; controlling, according to the calculated detection time information and detection angle information, a lidar detector of the three-dimensional topographic mapping system to point to a start detection point of the predetermined ground area, and point to all target detection points of the predetermined ground area according to a predetermined trajectory; controlling, according to the calculated detection time information, the lidar detector to transmit a first laser detection signal to all the target detection points, and receive a second laser detection signal reflected by the target detection point; and adding the detection time information, the detection angle information, and three-dimensional location coordinates of the lidar detector to the first laser detection signal and the second laser detection signal, performing encoding to form the mapping data, and returning the mapping data to the ground apparatus.

Optionally, before the adding the detection time information, the detection angle information, and three-dimensional location coordinates of the lidar detector to the first laser detection signal and the second laser detection signal, the method further includes: processing the second laser detection signal reflected by the target detection point.

Optionally, the processing the second laser detection signal reflected by the target detection point includes at least one of the following: narrowband filtering, photoelectric conversion, and power amplification.

Optionally, the adding the detection time information, the detection angle information, and three-dimensional location coordinates of the lidar detector to the first laser detection signal and the second laser detection signal includes: collecting wind speed information of a location at which the lidar detector is located, and correcting the three-dimensional location coordinates of the lidar detector according to the wind speed information.

Optionally, after the returning the mapping data to the ground apparatus, the method further includes: calculating, by the ground apparatus, a time difference between a transmission time of the first laser detection signal transmitted to the target detection point and a reception time of the corresponding second laser detection signal; calculating to obtain a distance between the lidar detector and the target detection point according to the time difference; calculating to obtain three-dimensional location coordinates of the target detection point according to the three-dimensional location coordinates of the lidar detector, the detection angle information, and the distance between the lidar detector and the target detection point; and summarizing three-dimensional location coordinates of all the target detection points of the predetermined ground area according to the detection time information, to obtain the three-dimensional DEM data of the predetermined ground area.

In a three-dimensional topographic mapping system and mapping method according to embodiments of the present disclosure, characteristics of stability and fixed-point camping of a floating platform are used, and a lidar detection apparatus is disposed on the floating platform to map a predetermined ground area and cooperate with a ground apparatus to calculate mapping data so as to obtain three-dimensional DEM data of the predetermined ground area, thereby implementing efficient and accurate mapping of the three-dimensional DEM data and resolving a problem in the prior art that mapping accuracy and mapping efficiency are relatively low when a remote control aircraft is used for mapping of the three-dimensional DEM data, and further achieving a technical effect of performing wide-range, sustained, fast, and high-precision mapping for the three-dimensional DEM data.

BRIEF DESCRIPTION OF THE DRAWING

Accompany drawings constituting a part of the application are intended for further understanding of the present disclosure. Exemplary embodiments and descriptions thereof in the present disclosure are intended to interpret the present disclosure and do not constitute any improper limitation on the present disclosure. In the accompany drawings.

DESCRIPTION OF EMBODIMENTS

It should be noted that the embodiments in this application and features in the embodiments may be combined with each other without conflicts. The following describes the present disclosure in detail with reference to accompanying drawings and embodiments.

To make a person skilled in the art understand the solutions in the present disclosure better, the following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

It should be noted that in the specification, claims, and forgoing accompanying drawings of the present disclosure, the terms "first", "second", and so on are intended to distinguish between similar objects but do not necessarily indicate a specific order or a specific sequence. It should be understood that the data termed in such a way are interchangeable in proper circumstances so that the embodiments of the present disclosure described herein can be implemented in an order except the order illustrated or described herein. In addition, the terms "include", "contain", and any other variants thereof are intended to cover a non-exclusive inclusion. For example, a process, a method, a system, a product, or a device that includes a series of steps or units is not limited to the clearly listed steps or units, but optionally further includes a step or unit that is not clearly listed, or another inherent step or unit of the process, the method, the product, or the device.

Embodiment 1

An embodiment of the present disclosure provides a three-dimensional topographic mapping system.

Figure 1:
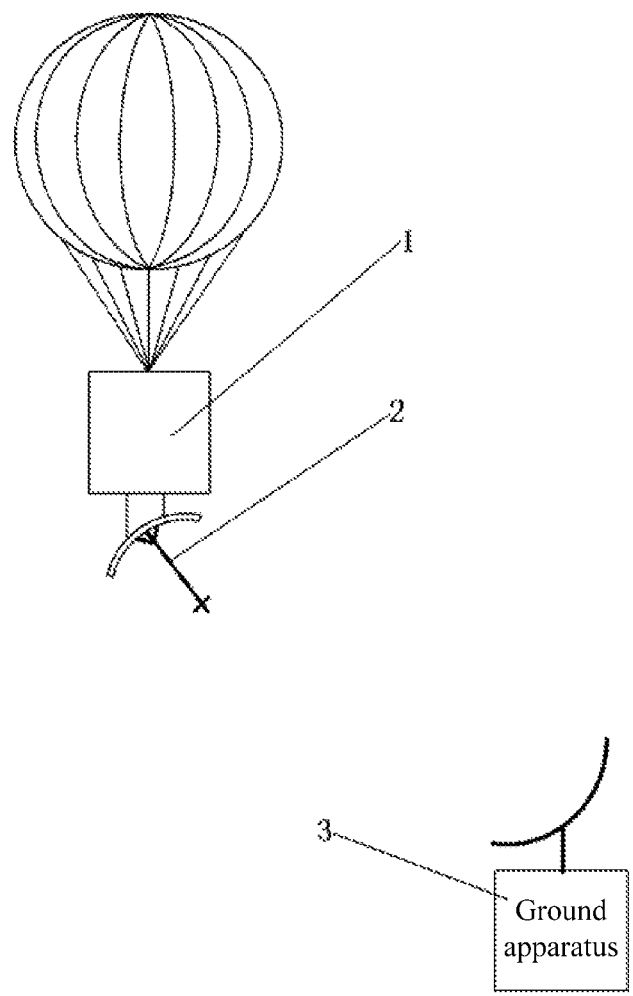
FIG. 1 is a schematic structural diagram of an optional three-dimensional topographic mapping system according to an embodiment of the present disclosure.

FIG. 1 is a schematic structural diagram of an optional three-dimensional topographic mapping system according to the embodiment of the present disclosure. As shown in FIG. 1, the system includes: a floating platform 1, a detection apparatus 2, and a ground apparatus 3, where the floating platform 1 is located in the stratosphere above a predetermined ground area that is to be mapped, and atmospheric motion in the stratosphere in a vertical direction is almost zero and the stratosphere is highly stable, so that three-dimensional topographic mapping data is more accurate. The detection apparatus 2 is positioned on the floating platform 1 and configured to map the predetermined ground area according to mapping instruction information transmitted by the ground apparatus 3, and return mapping data to the ground apparatus 3. The ground apparatus 3 is configured to transmit the mapping instruction information to the detection apparatus 2 according to a predetermined mapping task, and process the mapping data returned by the detection apparatus 2, to obtain three-dimensional digital elevation model DEM data of the predetermined ground area.

In the three-dimensional topographic mapping system according to the embodiment of the present disclosure, characteristics of stability and fixed-point staying in the air of the floating platform are used, and the detection apparatus is arranged on the floating platform to map the predetermined ground area and cooperate with the ground apparatus to calculate the mapping data so as to obtain the three-dimensional DEM data of the predetermined ground area, thereby implementing efficient and accurate mapping of the three-dimensional DEM data and resolving a problem in the prior art that mapping accuracy and mapping efficiency are relatively low when a remote control aircraft is used for mapping of the three-dimensional DEM data, and further achieving a technical effect of performing rapid updating for map data.

Figure 2:
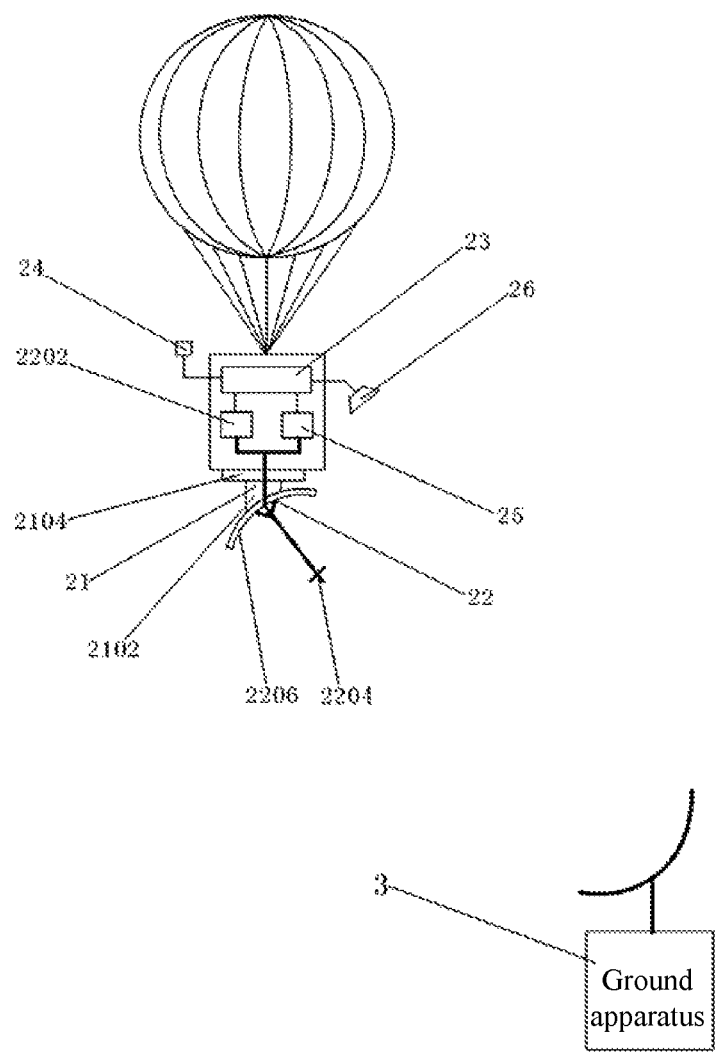
FIG. 2 is a schematic structural diagram of another optional three-dimensional topographic mapping system according to an embodiment of the present disclosure.

FIG. 2 is a schematic structural diagram of another optional three-dimensional topographic mapping system according to an embodiment of the present disclosure.

Figure 3:
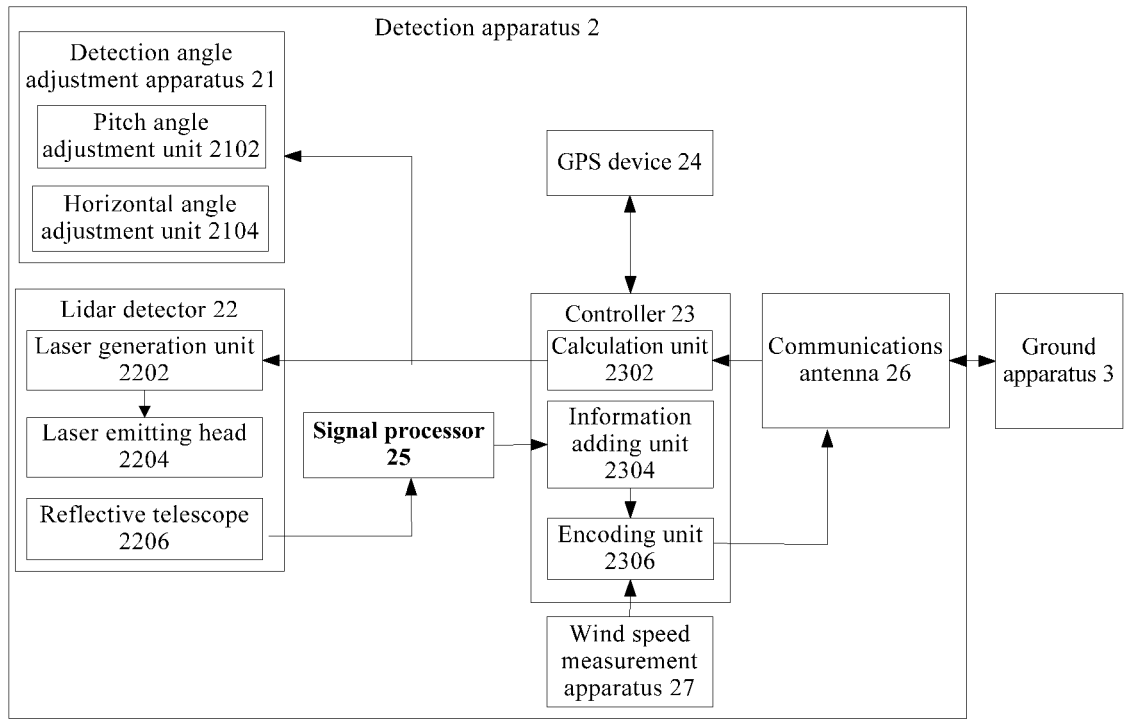
FIG. 3 is a structural block diagram of an optional three-dimensional topographic mapping system according to an embodiment of the present disclosure.

FIG. 3 is a structural block diagram of an optional three-dimensional topographic mapping system according to an embodiment of the present disclosure.

As shown in FIG. 2 and FIG. 3, the detection apparatus 2 includes a detection angle adjustment apparatus 21, a lidar detector 22, and a controller 23. The detection angle adjustment apparatus 21 is connected to the lidar detector 22 and configured to control, according to detection time information and detection angle information that are calculated by the controller 23, the lidar detector 22 to point to a start detection point of the predetermined ground area, and point to all target detection points of the predetermined ground area according to a predetermined trajectory. Specifically, the detection angle adjustment apparatus 21 includes a pitch angle adjustment unit 2102 and a horizontal angle adjustment unit 2104, where the pitch angle adjustment unit 2102 is configured to adjust a pitch angle of the lidar detector 22, and the horizontal angle adjustment unit 2104 is configured to adjust a horizontal angle of the lidar detector 22. Optionally, the pitch angle can be adjusted in a range of −60° to +60° using a horizontal plane as a reference, and the horizontal angle can rotate freely within a range of 360°. By means of adjustment by of the detection angle adjustment apparatus 21, the lidar detector 22 can cover a ground range of more than 3,000 square kilometers.

The lidar detector 22 is configured to transmit, according to the detection time information calculated by the controller 23, a first laser detection signal to all the target detection points of the predetermined ground area, and receive a second laser detection signal reflected by the target detection point. Specifically, the lidar detector 22 includes a laser generation unit 2202, a laser emitting head 2204, and a reflective telescope 2206. The laser generation unit 2202 is configured to generate the first laser detection signal. Optionally, the laser generation unit 2202 uses an Nd:YAG solid-state laser. A wavelength of the transmitted first laser detection signal is 1064 nm, all emission energy is less than 50 mJ, and a repetition frequency is not less than 1000 Hz. The laser emitting head 2204 and the reflective telescope 2206 are mounted on the detection angle adjustment apparatus 21 and move along with the detection angle adjustment apparatus 21. The laser emitting head 2204 is connected to the laser generation unit 2202 by using an optical fiber, and is configured to directly transmit the first laser detection signal to the target detection point. The laser emitting head 2204 is mounted in a central part of the reflective telescope 2206. The reflective telescope 2206 points to a ground in a direction same as that of the laser emitting head 2204, and is configured to receive the second laser detection signal reflected by the target detection point of the predetermined ground area.

The controller 23 is connected to the detection angle adjustment apparatus 21 and the lidar detector 22, and is configured to calculate the detection time information and the detection angle information according to the mapping instruction information, form the mapping data by using the first laser detection signal and the second laser detection signal, and return the mapping data to the ground apparatus 3. Specifically, as shown in FIG. 3, the controller 23 includes a calculation unit 2302, an information adding unit 2304, and an encoding unit 2306. The calculation unit 2302 is configured to calculate the detection time information and the detection angle information according to the mapping instruction information. The detection time information includes the start time of a detection task and time information of detecting each target detection point during a detection process. The detection angle information is an initial angle when the lidar detector 22 points to the start detection point of the predetermined ground area. The information adding unit 2304 is configured to add the detection time information, the detection angle information, and three-dimensional location coordinates of the lidar detector 22 to the first laser detection signal and the second laser detection signal. The encoding unit 2306 is configured to encode the first laser detection signal and the second laser detection signal to which the detection time information, the detection angle information, and the three-dimensional location coordinates of the lidar detector 22 are added, to obtain the mapping data.

As shown in FIG. 2 and FIG. 3, the detection apparatus 2 further includes a global positioning system GPS device 24, a signal processor 25, a communications antenna 26, and a wind speed measurement apparatus 27. The global positioning system GPS device 24 and the wind speed measurement apparatus are connected to the controller 23, where the three-dimensional location coordinates of the lidar detector 22 are acquired by the global positioning system GPS device 24. Since the three-dimensional location coordinates of the lidar detector 22 may be affected by a wind speed at a location in the stratosphere at which the lidar detector 22 is located, the wind speed measurement apparatus 27 can measure wind speed information of the location in the stratosphere at which the lidar detector 22 is located, and transmit the wind speed information to the encoding unit 2306 in the controller 23, and then the encoding unit 2306 corrects the three-dimensional location coordinates of the lidar detector according to the measured wind speed information. In addition, the global positioning system GPS device 24 is further configured to update a reference time of the controller 23, so as to ensure that the information adding unit 2304 can add accurate detection time information to the first laser detection signal and the second laser detection signal. The signal processor 25 is connected to the reflective telescope 2206 in the lidar detector 22, and is configured to process the second laser detection signal reflected by the target detection point.

After reaching the ground, the first laser detection signal transmitted by the laser emitting head 2204 generates diffuse reflection, and the reflected second laser detection signal returns to the reflective telescope 2206 through atmospheric propagation. During the process, the signal is attenuated and doped with noise. After receiving the second laser detection signal, the reflective telescope 2206 firstly transmits the second laser detection signal to the signal processor 25 for narrowband filtering, photoelectric conversion, and power amplification. The narrowband filtering can increase a signal-to-noise ratio of the signal, and the photoelectric conversion converts a laser signal into a digital-form electrical signal that can be processed.

The communications antenna 26 is connected to the controller 23. The encoding unit 2306 encodes the first laser detection signal and the second laser detection signal to obtain the mapping data, and returns the mapping data to the ground apparatus 3 by using the communications antenna 26. Furthermore, the controller 23 also uses the communications antenna 26 to complete receiving of the mapping instruction information from the ground apparatus.

Embodiment 2

An embodiment of the present disclosure provides a three-dimensional topographic mapping method that uses the three-dimensional topographic mapping system in the foregoing embodiment.

Figure 4:
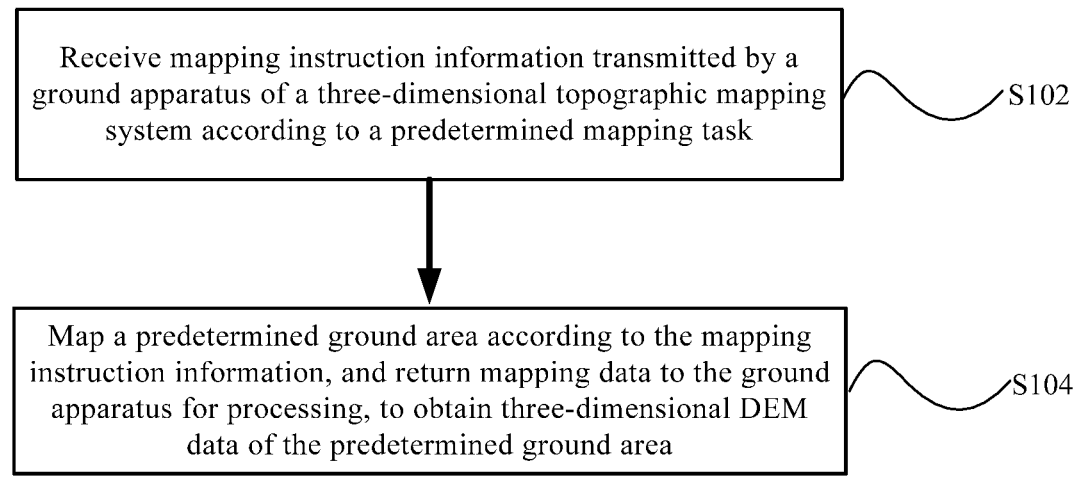
FIG. 4 is a flowchart of an optional three-dimensional topographic mapping method according to an embodiment of the present disclosure.

FIG. 4 is a flowchart of an optional three-dimensional topographic mapping method according to an embodiment of the present disclosure. As shown in FIG. 4, the method includes the following step S102 and step S104:

Step S102: Receive mapping instruction information transmitted by the ground apparatus 3 of the three-dimensional topographic mapping system according to a predetermined mapping task.

Step S104: Map a predetermined ground area according to the mapping instruction information, and return mapping data to the ground apparatus 3 for processing, to obtain three-dimensional DEM data of the predetermined ground area.

In the three-dimensional topographic mapping method according to the embodiment of the present disclosure, characteristics of stability and fixed-point staying in the air of a floating platform are used, and a detection apparatus is arranged on the floating platform to receive the mapping instruction information transmitted by the ground apparatus according to the predetermined mapping task and map the predetermined ground area, and return the mapping data to the ground apparatus for processing, to obtain the three-dimensional DEM data of the predetermined ground area, thereby implementing efficient and accurate mapping of the three-dimensional DEM data and resolving a problem in the prior art that mapping accuracy and mapping efficiency are relatively low when a remote control aircraft is used for mapping of the three-dimensional DEM data, and further achieving a technical effect of performing rapid updating for map data.

Figure 5:
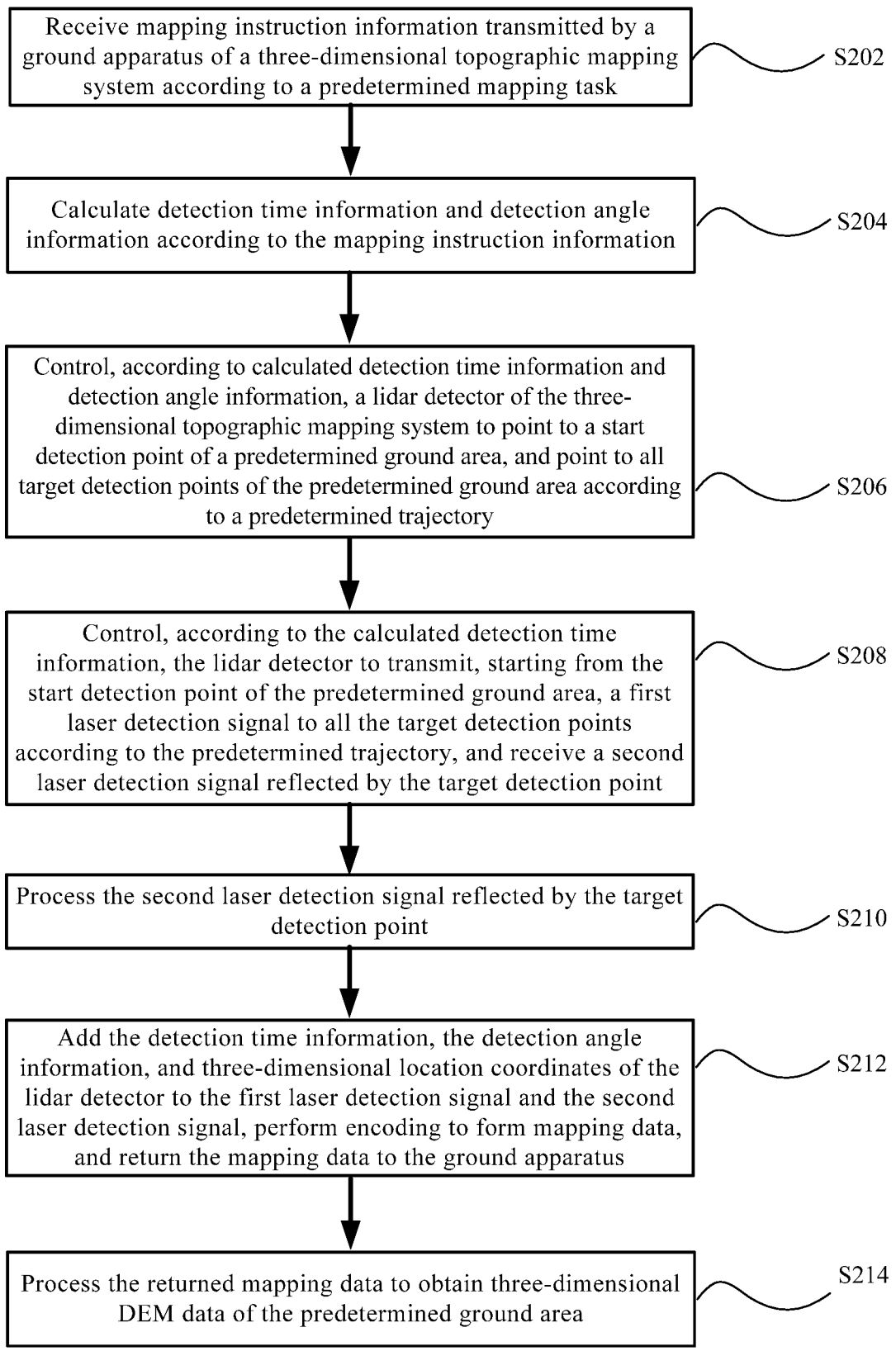
FIG. 5 is a flowchart of another optional three-dimensional topographic mapping method according to an embodiment of the present disclosure.

FIG. 5 is a flowchart of another optional three-dimensional topographic mapping method according to an embodiment of the present disclosure. As shown in FIG. 5, the method includes the following step S202 to step S214:

Step S202: Receive mapping instruction information transmitted by the ground apparatus 3 of the three-dimensional topographic mapping system according to a predetermined mapping task.

Step S204: Calculate detection time information and detection angle information according to the mapping instruction information.

Step S206: Control, according to calculated detection time information and detection angle information, the lidar detector 22 of the three-dimensional topographic mapping system to point to a start detection point of a predetermined ground area, and point to all target detection points of the predetermined ground area according to a predetermined trajectory.

Step S208: Control, according to the calculated detection time information, the lidar detector 22 to transmit, starting from the start detection point of the predetermined ground area, a first laser detection signal to all the target detection points according to the predetermined trajectory, and receive a second laser detection signal reflected by the target detection point.

Step S210: Process the second laser detection signal reflected by the target detection point.

Step S212: Add the detection time information, the detection angle information, and three-dimensional location coordinates of the lidar detector 22 to the first laser detection signal and the second laser detection signal, perform encoding to form mapping data, and return the mapping data to the ground apparatus.

Step S214: Process the returned mapping data to obtain three-dimensional DEM data of the predetermined ground area.

In specific implementation, the controller 23 in the detection apparatus 2 receives, by using the communications antenna 26, the mapping instruction information transmitted by the ground apparatus 3 according to the predetermined mapping task. During communication, the ground apparatus 3 transmits the mapping instruction information to the controller 23 in real time by using an L-band. The mapping instruction information includes the predetermined ground area that needs to be detected, three-dimensional location coordinates of the start detection point, and the detection time information. After the controller 23 receives the mapping instruction information, the calculation unit 2302 calculates an initial detection angle of the lidar detector 22 according to current three-dimensional location coordinates of the lidar detector 22 and the three-dimensional location coordinates of the start detection point. After calculating the detection angle, the calculation unit 2302 transmits a control instruction to the detection angle adjustment apparatus 21, and then the pitch angle adjustment unit 2102 and the horizontal angle adjustment unit 2104 separately adjust the detection angle of the lidar detector 22, to enable the lidar detector 22 to point to the start detection point of the predetermined ground area. In a subsequent mapping process, the detection angle adjustment apparatus 21 controls, according to a predetermined trajectory calculated by the controller 23, the laser emitting head 2204 to move from the start detection point and detect all the target detection points of the predetermined ground area in a scanning manner. At the same time, the controller 23 controls the laser emitting head 2204 to transmit the first laser detection signal to each target detection point, and records a transmission time T1 of the first laser detection signal. After reaching a target detection point on the ground, the first laser detection signal is reflected and the second laser detection signal is generated. The second laser detection signal is propagated in the atmosphere and reaches the reflective telescope 2206. At this time, a time T2 at which the second laser detection signal reaches the reflective telescope 2206 is recorded. The reflected second laser detection signal is processed by the signal processor 25 connected to the reflective telescope 2206, including narrowband filtering used to improve a signal-to-noise ratio of the signal, photoelectric conversion used to convert a laser signal into a digital-form electrical signal that can be processed, and power amplification.

Then the controller 23 adds, in chronological order of detection time, the corresponding detection time information and detection angle information, and the three-dimensional location coordinates of the lidar detector 22 to the first laser detection signal and the processed second laser detection signal, performs encoding, and returns a data packet to the ground apparatus 3 by using the communications antenna 26. The ground apparatus 3 processes the data packet.

Figure 6:
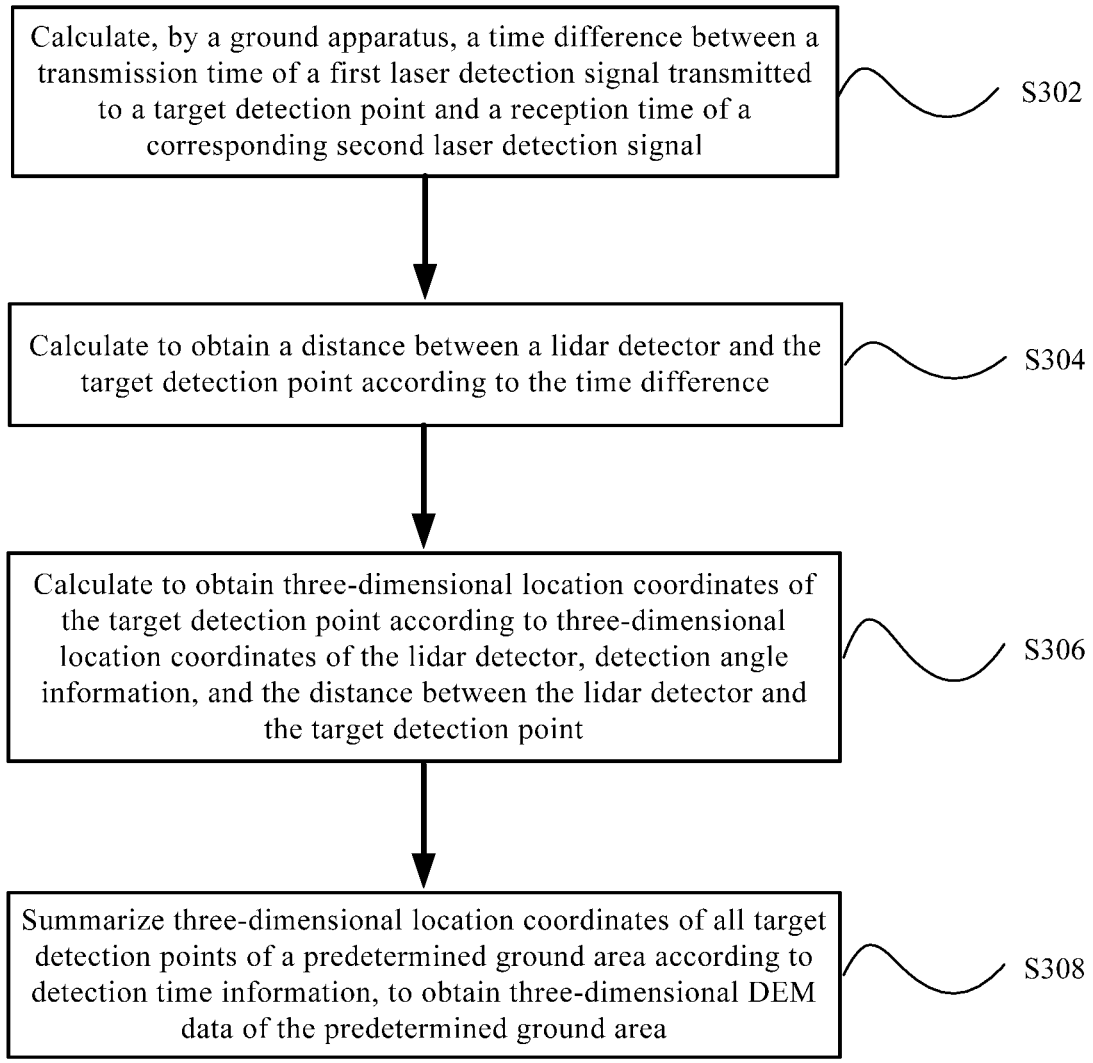
FIG. 6 is a flowchart of optional three-dimensional topographic mapping data processing according to an embodiment of the present disclosure.

FIG. 6 is a flowchart of optional three-dimensional topographic mapping data processing according to an embodiment of the present disclosure. As shown in FIG. 6, the processing the returned mapping data to obtain three-dimensional DEM data of the predetermined ground area includes the following step S302 to step S308:

Step S302: Calculate, by the ground apparatus 3, a time difference between a transmission time of the first laser detection signal transmitted to the target detection point and a reception time of the corresponding second laser detection signal.

Step S304: Calculate to obtain a distance between the lidar detector 22 and the target detection point according to the time difference.

Step S306: Calculate to obtain three-dimensional location coordinates of the target detection point according to the three-dimensional location coordinates of the lidar detector 22, the detection angle information, and the distance between the lidar detector 22 and the target detection point.

Step S308: Summarize three-dimensional location coordinates of all the target detection points of the predetermined ground area according to the detection time information, to obtain the three-dimensional DEM data of the predetermined ground area.

Specifically, after receiving the data packet returned by the detection apparatus 2, the ground apparatus 3 first calculates the time difference $\Delta T=T2-T1$ between the transmission time T1 of the first laser detection signal transmitted to the target detection point and the reception time T2 of the corresponding second laser detection signal; calculates to obtain, according to the time difference, the distance between the lidar detector 22 and the target detection point by using a formula $H=\frac{1}{2}C \cdot \Delta T$ (where, H is the distance between the lidar detector 22 and the target detection point, and C is a velocity of light); then calculates to obtain the three-dimensional location coordinates of the target detection point according to the three-dimensional location coordinates of the lidar detector 22, the detection angle information, and the distance between the lidar detector 22 and the target detection point; and finally summarizes three-dimensional location coordinates of all the target detection points of the predetermined ground area according to chronological order of detection time of all the target detection points, to obtain the three-dimensional DEM data of the predetermined ground area.

It should be noted that the three-dimensional topographic mapping system according to the embodiments of the present disclosure can be used to execute the three-dimensional topographic mapping method provided by the embodiments of the present disclosure. The three-dimensional topographic mapping method according to the embodiments of the present disclosure can also be executed by the three-dimensional topographic mapping system provided in the embodiments of the present disclosure.

It should be noted that, for ease of description, the foregoing method embodiments are described as a series of action combinations. However, a person skilled in the art should understand that the present disclosure is not limited to the described sequence of the actions, because some steps may be performed in another sequence or performed at the same time according to the present disclosure. In addition, a person skilled in the art should also understand that all the embodiments described in this specification belong to exemplary embodiments, and the involved actions and modules are not necessarily mandatory to the present disclosure.

In the foregoing embodiments, the description of each embodiment has respective focuses. For a part that is not described in detail in an embodiment, reference may be made to related descriptions in other embodiments.

In the several embodiments provided in the present application, it should be understood that the disclosed apparatus may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

The foregoing descriptions are merely exemplary embodiments of the present disclosure, but are not intended to limit the present disclosure. A person skilled in the art understands that the present disclosure may have various modifications and variations. Any modification, equivalent replacement, and improvement made without departing from the spirit and principle of the present disclosure shall fall within the protection scope of the present disclosure.

What is claimed is:

1. A three-dimensional topographic mapping system, comprising:
   a floating platform, wherein the floating platform is located in the stratosphere above a predetermined ground area that is to be mapped;
   a detection apparatus, arranged on the floating platform and configured to map the predetermined ground area according to mapping instruction information transmitted by a ground apparatus, and return mapping data to the ground apparatus; and
   the ground apparatus, configured to transmit the mapping instruction information to the detection apparatus according to a predetermined mapping task, and process the mapping data returned by the detection apparatus, to obtain three-dimensional digital elevation model (DEM) data of the predetermined ground area, wherein the detection apparatus comprises:
   a detection angle adjustment apparatus, connected to a lidar detector and configured to control, according to detection time information and detection angle information that are calculated by a controller, the lidar detector to point to a start detection point of the predetermined ground area, and point to all target detection points of the predetermined ground area according to a predetermined trajectory;
   the lidar detector, configured to transmit, according to the detection time information calculated by the controller, a first laser detection signal to all the target detection points of the predetermined ground area, and receive a second laser detection signal reflected by the target detection point; and
   the controller, connected to the detection angle adjustment apparatus and the lidar detector and configured to calculate the detection time information and the detection angle information according to the mapping instruction information, form the mapping data by using the first laser detection signal and the second laser detection signal, and return the mapping data to the ground apparatus, wherein wherein the detection apparatus further comprises:
   a wind speed measurement apparatus, connected to the controller and configured to collect wind speed information of a location at which the lidar detector is located, wherein the controller is further configured to correct the three-dimensional location coordinates of the lidar detector according to the wind speed information.

2. The system according to claim 1, wherein the lidar detector comprises:
   a laser generation unit, configured to generate the first laser detection signal;
   a laser emitting head, connected to the laser generation unit and configured to transmit the first laser detection signal to the target detection point of the predetermined ground area; and
   a reflective telescope, configured to receive the second laser detection signal reflected by the target detection point of the predetermined ground area.

3. The system according to claim 1, wherein the detection angle adjustment apparatus comprises:
   a pitch angle adjustment unit, configured to adjust a pitch angle of the lidar detector; and
   a horizontal angle adjustment unit, configured to adjust a horizontal angle of the lidar detector.

4. The system according to claim 1, wherein the controller comprises:
   a calculation unit, configured to calculate the detection time information and the detection angle information according to the mapping instruction information;
   an information adding unit, configured to add the detection time information, the detection angle information, and three-dimensional location coordinates of the lidar detector to the first laser detection signal and the second laser detection signal; and
   an encoding unit, configured to encode the first laser detection signal and the second laser detection signal to which the detection time information, the detection angle information, and the three-dimensional location coordinates of the lidar detector are added, to obtain the mapping data.

5. The system according to claim 4, wherein the detection apparatus further comprises:
   a global positioning system (GPS) device, connected to the controller and configured to collect the three-dimensional location coordinates of the lidar detector and update a reference time of the controller.

6. The system according to claim 1, wherein the detection apparatus further comprises:
   a signal processor, connected to the lidar detector and configured to process the second laser detection signal reflected by the target detection point.

7. The system according to claim 1, wherein the detection apparatus further comprises:
   a communications antenna, connected to the controller, wherein the controller receives the mapping instruction information by using the communications antenna, and returns the mapping data to the ground apparatus by using the communications antenna.

8. A three-dimensional topographic mapping method using the three-dimensional topographic mapping system according to claim 1, comprising:
   receiving mapping instruction information transmitted by a ground apparatus of the three-dimensional topographic mapping system according to a predetermined mapping task; and mapping a predetermined ground area according to the mapping instruction information, and returning mapping data to the ground apparatus for processing, to obtain three-dimensional DEM data of the predetermined ground area, wherein the mapping a predetermined ground area according to the mapping instruction information comprises:

calculating detection time information and detection angle information according to the mapping instruction information;

controlling, according to the calculated detection time information and detection angle information, a lidar detector of the three-dimensional topographic mapping system to point to a start detection point of the predetermined ground area, and point to all target detection points of the predetermined ground area according to a predetermined trajectory;

controlling, according to the calculated detection time information, the lidar detector to transmit a first laser detection signal to all the target detection points, and receive a second laser detection signal reflected by the target detection point; and adding the detection time information, the detection angle information, and three-dimensional location coordinates of the lidar detector to the first laser detection signal and the second laser detection signal, performing encoding to form the mapping data, and returning the mapping data to the ground apparatus, wherein the adding the detection time information, the detection angle information, and three-dimensional location coordinates of the lidar detector to the first laser detection signal and the second laser detection signal comprises:

collecting wind speed information of a location at which the lidar detector is located, and correcting the three-dimensional location coordinates of the lidar detector according to the wind speed information.

9. The method according to claim 8, wherein before the adding the detection time information, the detection angle information, and three-dimensional location coordinates of the lidar detector to the first laser detection signal and the second laser detection signal, the method further comprises:

processing the second laser detection signal reflected by the target detection point.

10. The method according to claim 9, wherein the processing the second laser detection signal reflected by the target detection point comprises at least one of the following:

narrowband filtering, photoelectric conversion, and power amplification.

11. The method according to claim 8, wherein after the returning the mapping data to the ground apparatus, the method further comprises:

calculating, by the ground apparatus, a time difference between a transmission time of the first laser detection signal transmitted to the target detection point and a reception time of the corresponding second laser detection signal;

calculating to obtain a distance between the lidar detector and the target detection point according to the time difference;

calculating to obtain three-dimensional location coordinates of the target detection point according to the three-dimensional location coordinates of the lidar detector, the detection angle information, and the distance between the lidar detector and the target detection point; and summarizing three-dimensional location coordinates of all the target detection points of the predetermined ground area according to the detection time information, to obtain the three-dimensional DEM data of the predetermined ground area.

* * * * *